(12) United States Patent
Lauer et al.

(10) Patent No.: US 8,147,303 B2
(45) Date of Patent: Apr. 3, 2012

(54) HARVESTED CROP CHOPPER REMAINS AND DISTRIBUTION ARRANGEMENT FOR A COMBINE

(75) Inventors: Friedrich Lauer, Krähenberg (DE); Norbert Pohlmann, Zweibrücken (DE); Dirk Weicholdt, Woelfling les Sarreguemines (FR); Rico Priesnitz, Blies-Ebersing (FR); Oliver Klein, Saarlouis (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/727,734

(22) Filed: Mar. 19, 2010

(65) Prior Publication Data
US 2010/0248802 A1 Sep. 30, 2010

(30) Foreign Application Priority Data
Mar. 26, 2009 (DE) ............ 10 2009 001 917

(51) Int. Cl.
*A01F 12/40* (2006.01)
(52) U.S. Cl. .................... 460/112; 460/111
(58) Field of Classification Search .......... 460/111, 460/112
See application file for complete search history.

(56) References Cited

U.S. PATENT DOCUMENTS

| | | | | |
|---|---|---|---|---|
| 1,770,707 A | * | 7/1930 | McDow | 239/673 |
| 2,766,872 A | * | 10/1956 | Pillsbury | 198/642 |
| 3,539,113 A | * | 11/1970 | Tyler | 239/673 |
| 3,889,883 A | * | 6/1975 | Anderson | 239/679 |
| 4,367,848 A | * | 1/1983 | Ehmke et al. | 239/665 |
| 4,442,979 A | * | 4/1984 | Kupper | 239/656 |
| 4,591,102 A | * | 5/1986 | Clarke | 239/655 |
| 4,763,844 A | * | 8/1988 | van der Lely et al. | 239/665 |
| 4,834,296 A | * | 5/1989 | van der Lely et al. | 239/676 |
| 4,842,202 A | * | 6/1989 | van der Lely et al. | 239/661 |
| 6,209,808 B1 | * | 4/2001 | Anderson | 239/682 |

(Continued)

FOREIGN PATENT DOCUMENTS
DE 19646590 A1 5/1998
EP 0213370 A2 3/1987
WO 2008156419 A1 12/2008

OTHER PUBLICATIONS
European Search Report dated Jun. 30, 2010, (4 pages).

*Primary Examiner* — Robert Pezzuto
*Assistant Examiner* — Mai Nguyen

(57) ABSTRACT

The invention concerns a harvested crop chopper remains-and-distribution arrangement for a combine (10) with a straw chopper (60) and an impeller blower (80) arranged downstream of the straw chopper (60), that includes at least one impeller blade (82) arranged to rotate in a direction of rotation about an axis (84) for the distribution across a field of the harvested crop remains provided by the straw chopper (60). An axially outer region (104, 106, 114) of the impeller blade (82) leading in the direction of rotation is curved or angled in the direction of rotation. The axial dimension of the axially outer region (106) of the impeller blade (82) increases toward the outside in the radial direction. The impeller blade (82) is provided with a region (104) adjacent to the axial outer region (106) of the impeller blade, whose axial dimension decreases toward the outside in the radial direction and that extends in the radial direction and that is flat or is curved in a concave shape towards the front in the radial direction and is flatter than the outer region (106).

11 Claims, 2 Drawing Sheets

U.S. PATENT DOCUMENTS

| | | |
|---|---|---|
| 6,572,035 B1 | 6/2003 | Pfeiffer |
| 6,893,340 B1 * | 5/2005 | Schmidt et al. ............... 460/111 |
| 7,473,171 B1 | 1/2009 | Schwinn et al. |
| 2003/0017861 A1 * | 1/2003 | Niermann et al. ............ 460/112 |
| 2007/0275775 A1 * | 11/2007 | Farley et al. .................. 460/111 |
| 2008/0188275 A1 * | 8/2008 | Mayerle et al. ............... 460/111 |

\* cited by examiner

HARVESTED CROP CHOPPER REMAINS AND DISTRIBUTION ARRANGEMENT FOR A COMBINE

FIELD OF THE INVENTION

The invention concerns a harvested crop remains chopper-and-distribution arrangement with a straw chopper and an impeller blower arranged downstream of the straw chopper, that distributes the harvested crop remains delivered by the straw chopper across the field and includes at least one impeller paddle that rotates about an axis in a direction of rotation, where at least one area of the leading surface of the impeller paddle is curved and/or angled in the direction of rotation.

BACKGROUND OF THE INVENTION

Agricultural combines are large machines that harvest, thresh, separate and clean harvested crop, planted agriculturally that carries corn. The clean corn thus received is stored in a corn tank arranged on the combine. The threshed out straw is usually either chopped and distributed over the field across the width of the cutter head or conducted around the straw chopper and deposited in a swath across the field without being chopped, in order to be able to take it up subsequently with a baler. The harvested crop remains, such as chaff and small straw particles, remaining at the rear outlet of the cleaning arrangement are distributed across the field by a chaff spreader or they are conducted through the straw chopper and distributed across the field.

DE 199 08 111 C1 describes a combine with a straw chopper and two impeller blowers arranged side by side alongside each other downstream of the straw chopper for the wide spread distribution of the straw across the field. The outlet of the straw chopper and the inlet of the impeller blowers arranged in a housing, that include the impeller blades that are flat in themselves and rotate about a vertical axis, are arranged in a single plane for the sake of transfer of harvested crop without change of direction.

US 2007/0015556 A1 describes a combine with a straw chopper in which the outlet of the straw chopper supplies the following impeller blowers from below at their circumference at an acute angle. The impeller blades of the impeller blowers are flat in themselves and are slanted upward in the direction of the axis of rotation.

WO 2008/156419 A1 describes a similar arrangement of the straw chopper; however the flow of harvested crop is deflected by a sheet metal plate downstream of the straw chopper, so that it is directed at the impeller blower in the radial direction but at a relatively sharp angle. The impeller blades of the impeller blower are flat in themselves.

U.S. Pat. No. 7,390,253 B2 describes a combine with impeller blowers rotating about horizontal axes extending in the direction of operation, each of which includes three impeller blades to the rear of which bevels are applied.

U.S. Pat. No. 6,343,896 B1 that is seen as forming a class, proposes a combine with impeller blowers rotating about horizontal axes extending in the direction of operation, each of which includes impeller blades curved to the front, in the direction of rotation, whose axial extent increases in the outward direction.

In the aforementioned impeller blowers with impeller blades that are flat in themselves, the harvested crop remains are delivered and distributed across the entire axial length of the impeller blades. Thereby they provide a corresponding surface of attack to a side wind that may result in an undesired sideways drift of the harvested crop remains. The impeller blades according to U.S. Pat. No. 6,343,896 B1 are not able to efficiently convey away harvested crop entering in the central region due to their geometry.

PURPOSE OF THE INVENTION

The purpose underlying the invention is seen in the need to define an impeller blower for a combine that permits a concentrated delivery of the material to be expelled that is less sensitive to any wind.

SUMMARY OF THE INVENTION

The problem is solved according to the invention by the teaching of patent claim 1, where the further patent claims cite characteristics that further develop the solution to great advantage.

A harvested crop remains chopper-and-distribution arrangement for a combine includes a straw chopper and an impeller blower arranged downstream of the straw chopper in the direction of the flow of the harvested crop. During the harvesting operation the straw chopper chops the harvested crop remains conducted to it, particularly straw.

It can also convey with its knives and if necessary additional conveyer blades other harvested crop remains, for example, chaff, this may be together with the straw in the chopper operation or selectively in a straw swath deposit operating mode, in which the straw is conducted past the straw chopper, only the harvested crop remains The harvested crop remains that are conveyed by the straw chopper are accepted by one, two or more impeller blowers and distributed across the field. Each of the impeller blowers includes one or more impeller blades that rotate about an axis during the operation.

The surface of the impeller blade interacting with the harvested crop remains that is leading in the direction of rotation includes at least one area curved in the forward direction and/or chamfered forward in the direction of rotation, on which the harvested crop remains slide to the rear and are there concentrated relative to the actual direction of the impeller blades.

The harvested crop remains are then delivered to the outside on the basis of the centrifugal force and are concentrated on the basis of the surface curved in the forward direction and/or chamfered area of the impeller blade. The result is that the distribution of the harvested crop remains becomes less sensitive to any wind.

An axially outer region of the impeller blade bulges in the direction of rotation towards the front and/or is angled, while an adjacent area, whose axial extent decreases towards the outside in the radial direction, extends as a flat surface in the axial direction or is curved in the concave direction in the direction of rotation, but is flatter than the axially outer area.

The axial dimensions of the axially outer area of the impeller blade of the outer area that is curved and/or angled in the direction of rotation (and If necessary, or the further area mentioned in the previous paragraph) increase in the radial direction of the impeller blades from inside to the outer radius in steps or smoothly. Thereby the harvested crop remains are concentrated gradually in the radial direction on their path from the inside to the outside up to their delivery, which reduced the sensitivity of the harvested crop remains to the wind.

In addition, a further area of the impeller blade may be provided located at the edge of the impeller blade that is spaced away from the aforementioned axially outer area of the impeller blade and is bulged and/or angled to the front in the direction of rotation.

Preferably, the axial dimension of the central area decreases from the inside to the outside at the same rate as the axial dimension of the outer region and if necessary the outer region and a further region increases.

The attachment of the impeller blade to a shaft of the impeller blower that is driven in rotation can be performed in various ways, for example, by a direct connection between a shaft and the impeller blade that can be performed by welding or threading.

In a preferred embodiment, the shaft of the impeller blower drives a circular rotating disk, to which the impeller blade or blades are attached, in that they are provided with or equipped with a chamfered or bored attaching flange that is connected to the rotating disk with a threaded or another connection, for example, riveted or welded.

Various possibilities exist for the arrangement of the straw chopper and the impeller blower, relative to each other within the frame of the concept of the idea of the invention. In that way the straw chopper supply the impeller blower in the exact radial direction (compare DE 199 08 111 C1) or to the radial outer edge of the impeller blower at an acute angle or an obtuse angle (see US 2007/0015556 A1) or the harvested crop remains are conducted to the impeller blower in the axial direction, either exactly axially (see EP 0 631 717 A1) or at an acute angle or obtuse angle, with (see WO 2008/156419 A1) or without any angular deflection of the harvested crop remains downstream of the straw chopper by means of a deflection element, (see DE 10 2007 037 485 B3).

When the harvested crop remains are conducted to the impeller blower in the axial direction an obvious solution is to arrange the axially outer area of the impeller blade that was angled towards the front and/or curved so that it faces the straw chopper. Thereby, not only the delivery of the harvested crop remains is improved, as described above, but also their reception.

BRIEF DESCRIPTION OF THE DRAWINGS

Several embodiments of the invention are explained on the basis of the Figures, in which.

DETAILED DESCRIPTION OF THE PREFERRED EMBODIMENTS

Figure 1:
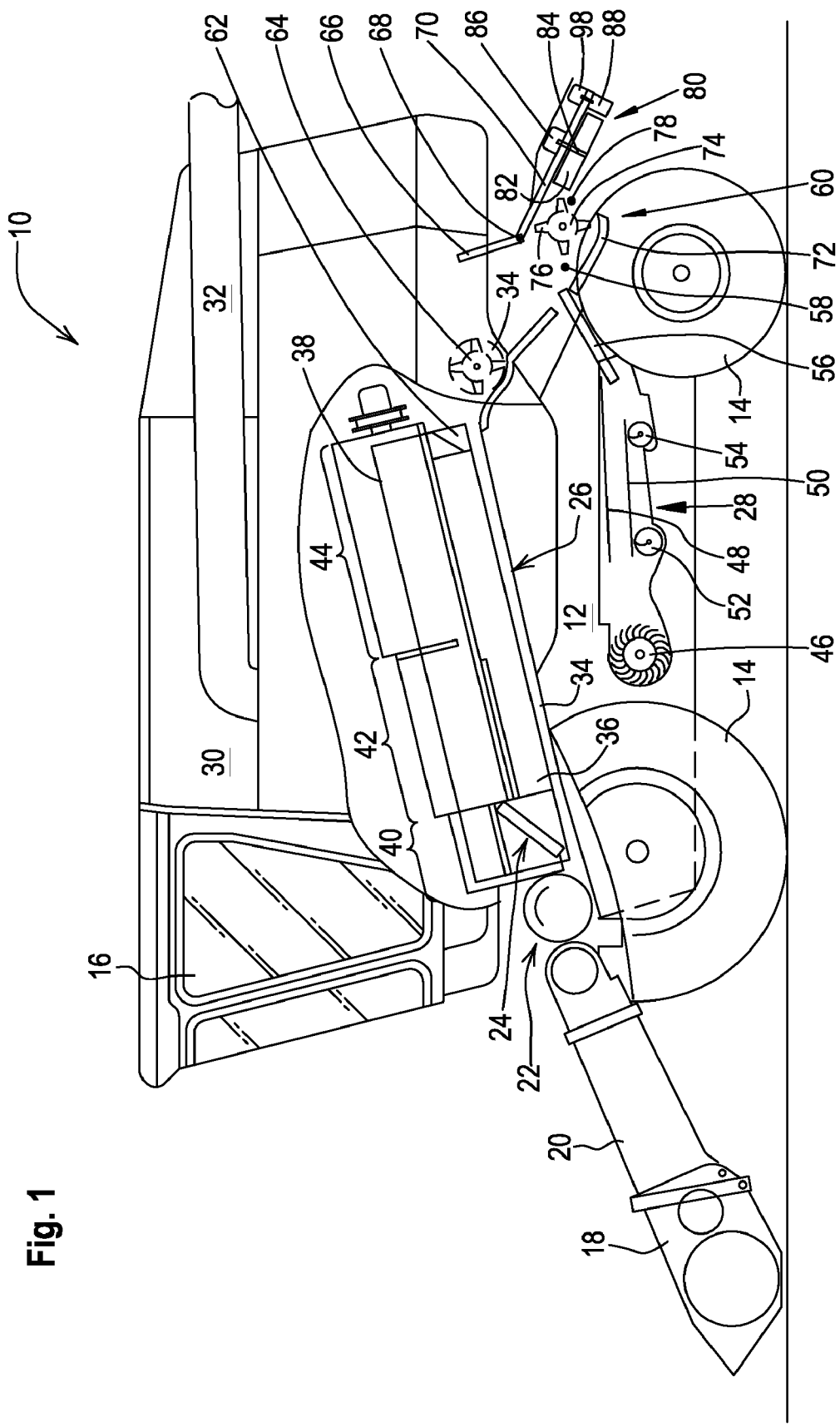
FIG. 1 shows a partial section of a side view of a combine with a straw chopper and impeller blowers.

FIG. 1 shows an agricultural combine 10 with a chassis 12, with wheels 14 in contact with the ground that are fastened to the chassis 12 and are used for the propulsion of the combine 10 in the forward operating direction that extends to the left in FIG. 1. The operation of the combine 10 is controlled from the operator's cab 16. A cutter head 18 is used in order to harvest crop containing corn and to conduct it to a slope conveyor 20.

The harvested crop is conducted by the slope conveyor 20 to a guide drum 22. The guide drum 22 conducts the harvested crop through an inlet transition section 24 to an axial harvested crop processing arrangement 26. In the following, directions such as front and rear refer to the forward operating direction of the combine 10 that extends to the left in FIG. 1.

The harvested crop processing arrangement 26 includes a rotor housing 34 and a rotor 36 arranged within it. The rotor 36 includes a hollow drum 38 to which crop processing elements are fastened for a charging section 40, a threshing section 42, and a separating section 44. The charging section 40 is arranged at the front side of the axial harvested crop processing unit 26. The threshing section 42 and the separating section 44 are located downstream in the longitudinal direction and to the rear of the charging section 40. In the charging section 40 the drum 38 is configured as a truncated cone. The threshing section 42 includes a forward section in the form of a truncated cone and a cylindrical rear section. The cylindrical separating section 44 of the drum 38 is located at the end of the axial harvested crop processing unit 26. In place of an axial harvested crop processing unit 26 a tangential threshing drum and a following axial separating arrangement or a following straw shaker could also be used.

Corn and chaff that fall through a thresher basket associated with the threshing section 42 and a separating grate associated with the separating section 44 are conducted to a cleaning system 28 with a blower 46 and disk-shaped sieves 48, 50 that can be brought into an oscillating movement. The cleaning system 28 removes the chaff and conducts the clean corn to an elevator for clean corn (not shown) over a screw conveyor 52. The elevator for clean corn deposits the clean corn in a corn tank 30. The clean corn in the corn tank 30 can be unloaded by an unloading screw conveyor 32 to a corn wagon, trailer or truck. Harvested crop remaining at the rear end of the lower disk-shaped sieve 50 is conducted again to the harvested crop processing unit 26 by means of a screw conveyor 54 and an overshot conveyor (not shown). The harvested crop remains delivered at the rear end of the upper disk-shaped sieve that essentially consist of chaff and small straw particles are conveyed to the rear by means of an oscillating bottom conveyor 56 into an inlet 58 of a straw chopper 60.

Threshed out straw leaving the threshing section 44 is ejected from the harvested crop processing arrangement 26 through an outlet 62 and conducted to an ejection drum 64. The ejection drum 64 interacting with a bottom 66 arranged underneath it ejects the straw to the rear. A flap 66 is located to the rear of the ejection drum 64 that is used to switch between swath depositing operation and a chopper operation. The flap 66 is connected in a joint at its rear lower end, so as to pivot about a horizontal axis 68 extending horizontally and transverse to the forward operating direction. It can be operated manually by an operator or by means of a drive actuated by external forces (not shown) from the operators cab 16 between a swath depositing position, in which the flap 66 is pivoted downward from its position shown in FIG. 1 and closes the inlet 58 of the straw chopper 60, and a chopper position in which the flap 66 is shown in FIG. 1. In its chopper position, the flap 66 extends from the axis 68 at an angle forward and upward. A slide 70 on which the straw can slide to the surface of the field during the swath depositing operation rigidly connected to the chassis 12 is positioned behind and below the axis 68. The swath of straw can be brought into a desired shape by guide skids or straw guide rakes (not shown) attached to the upper side of the slide 70.

The straw chopper 60 is located below the slide 70. It is composed of a housing 72 and a rotor 74 arranged within the housing that can rotate about a horizontal axis extending transverse to the forward operating direction, with chopper knives 76 suspended in pairs and distributed about the circumference of the rotor and if necessary additional conveyer blades.

Additional impeller blades (not shown) may be fastened to the rotor 74 to convey air such that they surround some or all of the chopper knives 76.

The slide 70 forms an upper housing for the straw chopper 60. Downstream of an outlet 78 of the straw chopper 60, two impeller blowers 80 are provided under the slide 70, only one of which can be seen in FIG. 1, and to which the straw chopper 60 conducts the harvested crop remains in the axial direction at a relatively acute angle from below. The impeller blowers 80 include several impeller blades 82 that are attached in each case rigidly underneath the rotary plates 102, which in turn are connected to a shaft extending orthogonally to the slide 70 that can rotate about axes 84, extending approximately in the vertical direction but inclined slightly upward and to the rear. The shafts can be brought into rotation in each case by a hydraulic motor 86.

In the swath deposit position the straw chopper 60 conveys only the harvested crop remains from the cleaning system 28 to the impeller blowers 80 that distribute it on the field approximately across the width of the cutter head 18. During the chopper operation the straw chopper 60 also chops the straw from the outlet 62 of the harvested crop processing arrangement 26 that is thrown against the flap 66 by the ejection drum 64 which then falls downward into the inlet 58 of the straw chopper 60. Moreover, the straw chopper 60 could also be provided with an upper housing independently of the slide 70, to which the impeller blowers 80 could also be fastened. It would also be conceivable that a retaining arrangement separate from the slide 70 and a housing 72 for the straw chopper 60 be provided for the impeller blowers 80. It would also be possible to arrange the straw chopper 60 and the impeller blowers 80 in such a way that the straw chopper 60 supplies the impeller blowers 80 from above, where then the rotary plates 102 are arranged underneath the impeller blades 82. In another embodiment the axis of rotation 84 of the impeller blowers 80 are horizontal.

Figure 2:
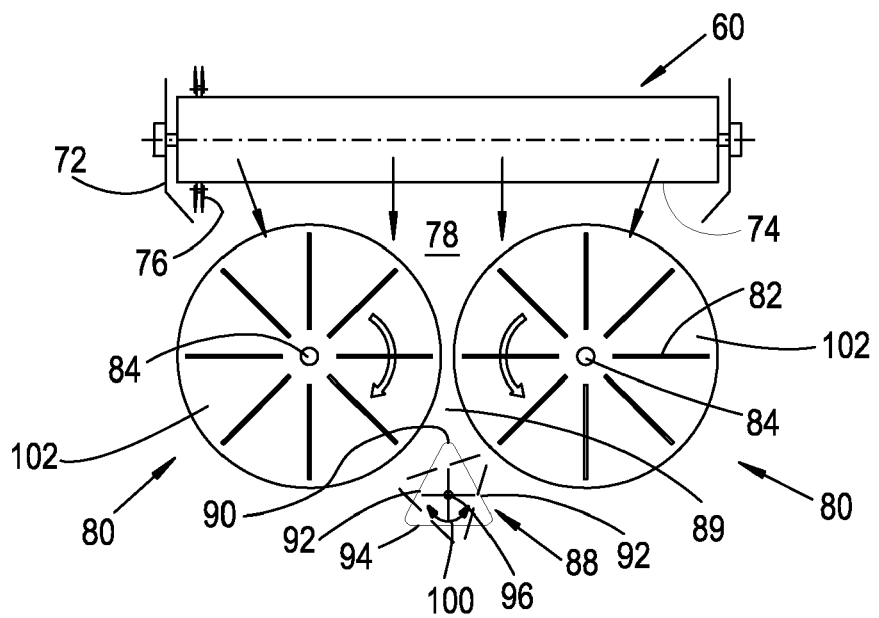
FIG. 2 shows a plan view of the straw chopper and the impeller blowers.

Reference shall now be made to FIG. 2, in which the harvested crop remains chopper-and-distribution arrangement of the combine 10 is shown in a plan view. The harvested crop remains chopper-and-distribution arrangement includes the straw chopper 60 and the impeller blowers 80. In addition, a harvested crop flow separating element 88 is provided with a forward point 90, that is located, as is the entire harvested crop flow separating element 88, to the rear of the axes of rotation 84 of the impeller blowers 80 in their gore region 89, and two straight side walls 92, each of which is arranged adjacent to an impeller blower 80. The harvested crop flow separating element 88 oscillates about an approximately central axis 96, extending parallel to the axis 84 of the impeller blower 80 and can be brought into an oscillating movement by a drive 98, attached above the slide 70 to the rear of the hydraulic motors 86.

Figure 3:
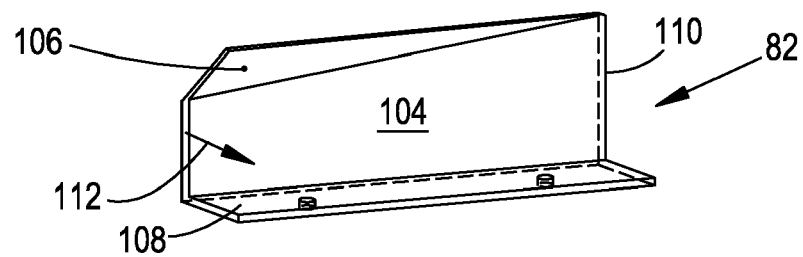
FIG. 3 shows a perspective view of a first embodiment of an impeller blade for the impeller blower of the combine of FIG. 1.

FIG. 3 shows a perspective view of a first embodiment of an impeller blade 82. The impeller blade 82 is preferably configured as a one piece component by bending sheet metal or is an injection molded plastic component that includes a central region 104 that is connected on one side to an outer region 106 and on the other side to a beveled attaching flange 108. The attaching flange 108 is provided with holes that are used to fasten the impeller blade 82 to the rotary plate 104 by means of screws. The right end 110 of the impeller blade 82, shown in FIG. 3, faces the axis 84 in the assembled condition, so that in FIG. 3 the axial direction extends from above to below and the radial direction extends from right to left. In normal operation, the direction of rotation of the impeller blade 82 is indicated by the arrow 112. Accordingly the attaching flange 108 is angled to the front by 90° in the direction of rotation and the outer region 106 is angled by approximately 45° relative to the central region 104. The central region 104 is flat in its self and extends in the axial and radial direction. The attaching flange 108 extends in the plane of the rotary plate 102. The outer region 106 is triangular in shape in the side view and extends from the radially inner end 110 of the impeller blade 82 to the radially outer region of the impeller blade 82 continuously increasing in size. It would also be possible to relocate the radially inner end of the outer region 106 further outward. The beveled, radially outer region 106 has the effect that the harvested crop remains entering from the straw chopper 60 gradually become concentrated in their path along the regions 106, 108 that they follow on the basis of the effect of the centrifugal force from the inside to the outside before they are delivered to the field and thereby also are concentrated in their distribution across the field, as a result of which the sensitivity to side winds is reduced. In addition the outer region 106 that is beveled in the direction of rotation improves the acceptance of the harvested crop remains from the straw chopper 60. The axial dimension of the central region 104 is reduced from the inside to the outside at the same rate as that at which the axial dimension of the outer region 106 increases.

Figure 4:
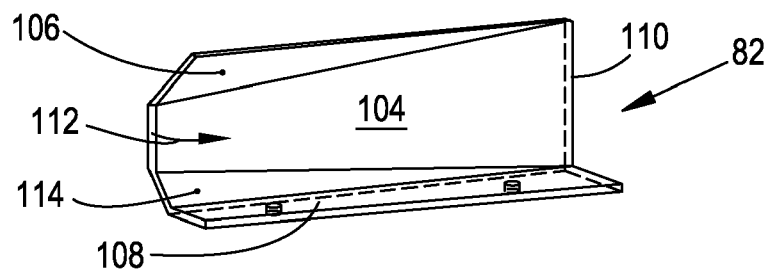
FIG. 4 shows a perspective view of a second embodiment of an impeller blade for the impeller blower of the combine of FIG. 1.

In the second embodiment of the impeller blade 82 shown in FIG. 4, elements that agree with the first embodiment are designated with the same part number callouts; the only difference is that a further angled region 114 is provided between central region 104 and the attaching flange 108. The further region 114 (the same as the outer region 106) is angled toward the front in the direction of rotation by approximately 45° relative to the central region 104, it is formed in the shape of a triangle in the side view and extends from the radially inner end 110 of the impeller blade 82 to the outer end of the impeller blade 82, where its axial dimension in the radial direction increases continuously from the radially inner end 110 of the impeller blade 82 to the radially outer end of the impeller blade 82. It would also be possible to reposition the radially inner end of the further region 114 further to the outside. In this embodiment the areas 106 and 114 concentrate the harvested crop remains to a relatively narrow central region 104 to the radially outer end, which leads to an even more concentrated delivery of the harvested crop remains.

Figure 5:
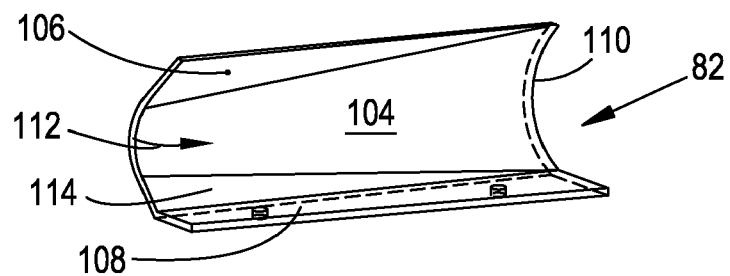
FIG. 5 shows a perspective view of a third embodiment of an impeller blade for the impeller blower of the combine of FIG. 1.

In the third embodiment of the impeller blade 82 shown in FIG. 5 in which elements coinciding with the second embodiment are provided with the same part number callouts, the only difference to the second embodiment should be noted, that the central region 104 is not flat in itself, but it is curved concave to the front, so that it forms a sort of groove boarded by the angled regions 106, 114 from inside to the outside that narrows in the radial direction, in which the harvested crop remains become concentrated. The angled regions 106, 114 are angled more steeply in the direction of rotation than the central region 104. In the embodiments according to FIGS. 4 and 5 the axial dimension of the central region 104 decreases from the inside to the outside at the same rate as the axial dimension of the outer region 106 and the further region 114 increases.

The invention claimed is:

1. A harvested crop remains chopper-and-distribution arrangement with a straw chopper (60) and an impeller blower (80) arranged downstream of the straw chopper (60), the impeller blower (80) including a shaft and at least one impeller blade (82) arranged so as to rotate about an axis (84) in a direction of rotation for the distribution across a field of the harvested crop remains delivered by the straw chopper, wherein an axially outer region (106) of the at least one impeller blade (82) is curved or angled towards the front of the at least one impeller blade, in the direction of rotation, wherein an axial dimension of the axially outer region (106) of the at least one impeller blade (82) increases as the axially outer region (106) extends outward in the radial direction, and wherein the at least one impeller blade (82) has an area (104) adjacent to the axially outer region (106), and wherein said area (104) has an axial dimension that decreases as the area (104) extends outward in a radial direction, and wherein said area (104) either flat or is curved to the front in a concave curve in the direction of rotation, and wherein said area (104) is flatter in an axial direction than the axially outer region (106).

2. The harvested crop remains chopper-and-distribution arrangement according to claim 1, wherein the axial dimension of the axially outer region (106) increases smoothly as the axially outer region (106) extends in the radial direction.

3. The harvested crop remains chopper-and-distribution arrangement according to claim 1, wherein the at least one impeller blade (82) includes a further region (114) that is spaced away from the axially outer region (106) and is angled to the front or is concave in the direction of rotation.

4. The harvested crop remains chopper-and-distribution arrangement according to claim 3, wherein an axial dimension of the further region (114) increases as the further region (114) extends outward in the radial direction.

5. The harvested crop remains chopper-and-distribution arrangement according to claim 1, wherein the axial dimension of the area (104) decreases as the area (104) extends outward at the same rate as the axial dimensions of the outer regions (106) increases.

6. The harvested crop remains chopper-and-distribution arrangement according to claim 1, wherein the at least one impeller blade (82) is provided with a chamfered attaching flange (108) with which the at least one impeller blade (82) is connected to an element of the impeller blower (80), said element being connected to the shaft of the impeller blower.

7. The harvested crop remains chopper-and-distribution arrangement according to claim 1, wherein the straw chopper (60) is arranged in such a way that it supplies the impeller blower (80) in the axial direction at an acute angle or at an obtuse angle.

8. The harvested crop remains chopper-and-distribution arrangement according to claim 1, wherein the axially outer region (106) faces the straw chopper (60).

9. A combine (10) comprising:
a chassis (12);
wheels (14) disposed to contact the ground and propel the chassis;
a cutter head (18) disposed at the front of the chassis to harvest crop;
a crop processing arrangement (26) disposed on the chassis to receive crop from the cutter head (18) and process the crop; and
a harvested crop remains chopper-and-distribution arrangement in accordance with claim 1 that is disposed to receive crop from the crop processing arrangement (26).

10. The harvested crop chopper-and-distribution arrangement according to claim 3, wherein the axial dimension of the area (104) decreases from the inside to the outside at the same rate as the axial dimension of the outer region (106) and an axial dimension of the further region (114) cumulatively increase.

11. The harvested crop chopper-and-distribution arrangement according to claim 6, wherein the element is a rotary plate (102).

* * * * *